United States Patent [19]
Karam et al.

[11] Patent Number: 5,431,851
[45] Date of Patent: Jul. 11, 1995

[54] COMPOSITE ELECTROLUMINESCENT PHOSPHOR

[75] Inventors: Ronald E. Karam; Richard G. Gingerich, both of Towanda, Pa.

[73] Assignee: Osram Sylvania Inc., Danvers, Mass.

[21] Appl. No.: 198,333

[22] Filed: Feb. 18, 1994

Related U.S. Application Data

[62] Division of Ser. No. 999,243, Dec. 31, 1992, Pat. No. 5,294,368.

[51] Int. Cl.⁶ .............. C09K 11/02; C09K 11/54; C09K 11/56
[52] U.S. Cl. .............. 252/301.4 R; 252/301.65; 428/403
[58] Field of Search .............. 252/301.65; 427/66; 428/403

[56] References Cited

U.S. PATENT DOCUMENTS

| | | | |
|---|---|---|---|
| 2,755,406 | 7/1956 | Burns | 252/301.65 |
| 3,264,133 | 8/1966 | Brooks | 427/66 |
| 3,299,307 | 1/1967 | Inoue | 252/301.65 |
| 3,471,323 | 10/1969 | Yamashita et al. | 427/66 |
| 4,902,929 | 2/1990 | Toyoda et al. | 427/66 |

Primary Examiner—Mark L. Bell
Assistant Examiner—C. M. Bonner
Attorney, Agent, or Firm—Elizabeth A. Levy; Robert F. Clark

[57] ABSTRACT

Composite electroluminescent phosphor particles may be made by forming, on a substrate, a composite layer comprising at least one layer of a dielectric or conductive material and at least one layer of an electroluminescent phosphor, physically removing the composite layer from the substrate, and pulverizing the composite layer to obtain composite electroluminescent phosphor particles.

9 Claims, No Drawings

COMPOSITE ELECTROLUMINESCENT PHOSPHOR

This is a division of application Ser. No. 07/999,243, filed on Dec. 31, 1992, now U.S. Pat. No. 5,294,368.

CROSS-REFERENCE TO RELATED APPLICATIONS

This application is related to Ser. Nos. 07/999,634, now U.S. Pat. No. 5,269,966, 07/999,241, now U.S. Pat. No. 5,273,274 and 07/999,637, now abandoned, all filed Dec. 31, 1992.

TECHNICAL FIELD

This invention relates to methods of making electroluminescent phosphors. In particular, it relates to methods of making electroluminescent phosphors by forming at least one composite layer comprising a first layer of a dielectric or conductive material on a substrate and a second layer of an electroluminescent phosphor deposited on the first layer, removing the composite layer from the supporting substrate beneath it, and pulverizing the composite layer to obtain composite electroluminescent phosphor particles consisting essentially of layers of an electroluminescent phosphor and a dielectric or conductive material. It also relates to electroluminescent phosphors and electroluminescent lamps made by this method.

BACKGROUND ART

Electroluminescent lamps made using thick-film phosphor deposition techniques (in which phosphors are dispersed in an organic binder and then applied to a substrate as a film having a thickness of between 5 and 20 micrometers) typically provide approximately 30 foot-lamberts of illumination and are thus suitable for various low-intensity illumination applications, such as decorative lighting, egress lighting, cockpit and dashboard display panels, and membrane switches. They have also been used as backlighting sources for liquid crystal display (LCD) devices. However, most LCD applications, including black/white and color LCD displays and high definition displays, require greater backlighting illumination than electroluminescent lamps can provide.

Zinc sulfide phosphors are commonly used in electroluminescent lamps. Methods of making them are described in U.S. Pat. Nos. 2,807,587 to Butler et al., 3,031,415 to Morrison et al., 3,031,416 to Morrison et al., 3,152,995 to Strock, 3,154,712 to Payne, 3,222,214 to Lagos et al., 3,657,142 to Poss, and 4,859,361 to Reilly et al., all of which are assigned to the assignee of the instant invention. However, none of these electroluminescent zinc sulfide phosphors are sufficiently bright for use in most LCD backlighting applications or high definition display devices.

It would be an advantage in the art to provide an electroluminescent phosphor having improved luminance for use in LCD and high definition display devices, and a method of making the phosphor.

SUMMARY OF THE INVENTION

It is an object of the invention to obviate the disadvantages of the prior art.

It is another object of the invention to provide an improved method of making electroluminescent phosphors.

It is another object of the invention to provide an electroluminescent phosphor having improved luminance.

In accordance with one aspect of the invention, there is provided a method of making composite electroluminescent phosphor particles, comprising the steps of: forming a composite layer on a substrate, the composite layer comprising at least one layer of a dielectric or conductive material and at least one layer of an electroluminescent phosphor, physically separating the composite layer from the substrate, and pulverizing the composite layer to obtain composite particles of an electroluminescent phosphor.

BEST MODE FOR CARRYING OUT THE INVENTION

For a better understanding of the present invention, together with other and further objects, advantages and capabilities thereof, reference is made to the following specification and appended claims.

The luminescent intensity of an electroluminescent phosphor may be increased substantially if the effective electric field applied across the phosphor is increased. One way to concentrate the effective electric field across the phosphor, and thereby increase luminescent intensity, is to decrease the distance across which the electric field is applied, that is, to create very thin phosphor films. "Very thin" phosphor films, as the term is used herein, means phosphor films which are generally less than about 0.5 micrometers thick. Another way to increase luminescent intensity of the phosphor is to align the phosphor particles within the electric field so that the areas across which the electric field is concentrated are perpendicular to the direction of the applied electric field.

It is believed that increased electroluminescent phosphor luminance may be obtained by creating a composite electroluminescent material which is capable of alignment under an applied electric field and which also concentrates the applied electric field. Such a composite material may be made, for example, by applying a very thin layer of an electroluminescent phosphor onto a relatively thick layer of a dielectric or conductive material, removing the composite layer so formed, and then pulverizing this composite layer into a powder.

The dielectric material may be, for example, any highly polarizable material having a high dielectric constant, such as a ferroelectric material. Ferroelectric materials, such as barium titanate, are crystalline dielectrics which are electrically nonconductive, yet highly polarizable under an applied electric field. Ferroelectric materials having an axially symmetric particle morphology are especially suitable for this application.

The conductive material may be, for example, any conductive or metallic film, such as aluminum. Since a conductive layer does not support an electric field, the electric field would concentrate across the insulating phosphor layers between the conductive layers, thereby increasing the effective electric field across the phosphor particles.

Alternating layers of dielectric or conductive material and electroluminescent phosphor may be applied to the substrate to form a composite layer. The composite layer may comprise single or multiple layers of dielectric and phosphor, or single or multiple layers of dielectric and conductive material and phosphor.

The layers of dielectric or conductive material are preferably relatively thick in comparison to the layers of electroluminescent phosphor. For example, a suitable thickness for the dielectric or conductive material layers is between about 5 and 20 micrometers. The layers of electroluminescent phosphor are preferably much thinner, preferably less than about 0.5 micrometers thick. The layers of dielectric or conductive material and phosphor having the desired thickness may be obtained by the use of various coating techniques, including sputtering methods, electron beam deposition methods and chemical vapor deposition methods.

The greater relative thickness of the dielectric or conductive material layers facilitates the removal of the composite layer from the supporting substrate. The composite layer may be removed from the substrate by bending the substrate over a roller having a diameter which is sufficiently small to cause the composite layer to loosen and release from the substrate.

The composite layer, after being removed from the supporting substrate, may be pulverized into a powder by milling, mulling, roll crushing, or other conventional pulverizing means. Excessive milling should be avoided so that the dielectric material retains its axially symmetric particle morphology and thus its polarizable nature.

The luminance of an electroluminescent phosphor made by the method of this invention may be equivalent to that obtained from commercially available fluorescent lamps.

While there have been shown what are at present considered to be the preferred embodiments of the invention, it will be apparent to those skilled in the art that various changes and modifications can be made herein without departing from the scope of the invention as defined by the appended claims.

We claim:

1. An electroluminescent phosphor comprising a powder having composite particles consisting essentially of at least one layer of a dielectric material and at least one layer of an electroluminescent material, the layer of dielectric material having a thickness of between about 5 and 20 micrometers and the layer of electroluminescent material having a thickness of less than about 0.5 micrometers.

2. The electroluminescent phosphor of claim 1 wherein said dielectric material is a ferroelectric material.

3. The electroluminescent phosphor of claim 1 wherein said dielectric material is a barium titanate.

4. The electroluminescent phosphor of claim 1 wherein said conductive material is aluminum.

5. An electroluminescent phosphor comprising a powder having composite particles consisting essentially of at least one layer of a conductive material and at least one layer of an electroluminescent material, the layer of conductive material having a thickness of between about 5 and 20 micrometers and the layer of electroluminescent material having a thickness of less than about 0.5 micrometers.

6. An electroluminescent phosphor comprising a powder having composite particles consisting essentially of at least one layer of a dielectric material, at least one layer of a conductive material and at least one layer of an electroluminescent material, the layer of dielectric material having a thickness of between about 5 and 20 micrometers, the layer of conductive material having a thickness of between about 5 and 20 micrometers and the layer of electroluminescent material having a thickness of less than about 0.5 micrometers.

7. The electroluminescent phosphor of claim 6 wherein said dielectric material is a ferroelectric material.

8. The electroluminescent phosphor of claim 6 wherein said dieletric material is a barium titanate.

9. The electroluminescent phosphor of claim 6 wherein said conductive material is aluminum.

* * * * *